United States Patent [19]

Iwasaki et al.

[11] Patent Number: 4,919,378

[45] Date of Patent: Apr. 24, 1990

[54] SUPPORT STRUCTURE FOR BICYCLE SADDLE

[75] Inventors: Yoshihisa Iwasaki, Sakai; Shogo Akamatsu, Izumi, both of Japan

[73] Assignee: Maeda Industries, Ltd., Osaka, Japan

[21] Appl. No.: 315,497

[22] Filed: Feb. 27, 1989

[30] Foreign Application Priority Data

Apr. 12, 1988 [JP] Japan .............................. 63-48983[U]

[51] Int. Cl.⁵ .................................................. A47F 1/10
[52] U.S. Cl. .................................... 248/295.1; 297/195
[58] Field of Search ............... 248/295.1, 297.1, 297.2, 248/298, 287, 125, 418, 223.4; 280/281.1; 297/195, 345; 70/19

[56] References Cited

U.S. PATENT DOCUMENTS

| 4,580,835 | 4/1986 | Angell et al. | 297/195 |
| 4,693,627 | 9/1987 | Borromeo | 297/195 X |
| 4,772,069 | 9/1988 | Szymski | 297/195 |
| 4,783,119 | 11/1988 | Moses | 297/195 |
| 4,789,172 | 12/1988 | Mueller | 297/195 X |

*Primary Examiner*—Ramon O. Ramirez
*Attorney, Agent, or Firm*—William H. Eilberg

[57] ABSTRACT

A support structure for a bicycle saddle comprising a first seat post mountable to a seat pipe of a bicycle frame, and a second seat post for supporting the saddle. The first seat post is provided at the upper end thereof with a post support portion having a mounting bore which extends obliquely upwardly and forwardly of the bicycle. The second seat post is slidably fitted in the mounting bore and held at an adjusted position relative thereto by a lock mechanism which is operable by the cyclist during riding.

12 Claims, 2 Drawing Sheets

SUPPORT STRUCTURE FOR BICYCLE SADDLE

BACKGROUND OF THE INVENTION

1. Field of the Invention

This invention relates to a support structure for a bicycle saddle. It more particularly relates to a saddle support structure which allows simultaneous positional adjustment of the saddle in the directions of the height and length of the bicycle to enable the cyclist to assume an optimum riding posture depending on running conditions.

2. Description of the Prior Art

Typically, a bicycle saddle is supported on a seat post which is inserted into and fixed to the seat pipe of the bicycle frame. The upper end of the seat pipe has a longitudinal cutout which is bounded by a pair of flanges or clips which are penetrated by a clamping or clipping bolt. Tightening and loosening of the clip bolt causes the clips to move toward and away from each other, thereby diametrically contracting and expanding the seat pipe upper end to lock and unlock the seat post. Thus, the saddle may be adjusted in vertical position by sliding thereof relative to the seat pipe when the clip bolt is loosened.

Generally, the seat pipe of the bicycle frame extends obliquely upward and rearward. Therefore, height adjustment of the saddle inevitably results in displacement thereof lengthwise of the bicycle. For example, the saddle is displaced rearwardly of the bicycle when it is adjusted to a higher position. Such a manner of saddle position adjustment is acceptable in most cases because a cyclist having long legs also has correspondingly long arms and therefore prefers a higher saddle position with the saddle located farther from the handlebar.

In special bicycles such as mountain bicycles or motocross bicycles (BMX bicycles), it is often required for the cyclist to assume various riding postures depending on the running conditions. For example, when running in an upward slope, the cyclist tries to bring his (or her) weight center upwardly and forwardly to produce a larger pedalling force, thus desiring a higher and forward saddle position. When running in an downward slope, on the other hand, the cyclist endeavors to shift the body weight center downward and rearward to ensure a higher running stability, consequently requiring a lower and rearward saddle position.

With the typical prior art saddle support structure, however, the saddle can be raised only with resultant rearward displacement thereof, and lowered only with forward shifting. Such shifting of the saddle lengthwise of the bicycle is quite against the requirements for mountain bicycles or BMX bicycles. Therefore, the cyclist must assume riding postures to meet various running conditions irrespective of the actual saddle position.

Japanese Utility Model Application Laid-open No. 59-64383 (Laid-open: April 27, 1984; Application No.: 57-160,114; Filed: October 22, 1982; Inventor and Applicant: Kazuo MURASAKI) discloses a bicycle saddle support structure which provides remote control adjustment of the saddle position. More specifically, this saddle support structure comprises a seat post slidably fitted in the seat pipe of the bicycle frame, and a compression coil spring accommodated within the seat pipe to upwardly urge the seat post from below. The seat post is formed on its cylindrical outer surface with engaging grooves, while the seat pipe is provided at its upper end with an annular engaging member. The engaging member is variable in diameter by operating a remote control lever for engagement with and disengagement from any one of the engaging grooves. The seat post becomes slidable relative to the seat pipe when the engaging member is disengaged from a particular engaging groove. The compression coil spring always urges the seat post upward, so that the saddle position can be adjusted simply by raising or lowering the cyclist's hips and subsequently bringing the engaging member into engagement with another engaging groove.

The saddle support structure of the above laid-open Japanese utility model application allows the cyclist to adjust the saddle position during riding. However, since the seat post is slidably guided by the bicycle frame seat pipe which extends upwardly rearward, height adjustment of the saddle results in undesirable shifting thereof lengthwise of the bicycle at least with respect to mountain bicycles or BMX bicycles, as hereinbefore described.

SUMMARY OF THE INVENTION

It is, therefore, an object of the invention to provide a bicycle saddle support structure which is capable of adjusting the saddle position simultaneously in the height and length directions of the bicycle to enable the cyclist to assume suitable riding postures depending on the running conditions.

Another object of the invention is to provide a saddle support structure which enables such saddle position adjustment during running.

A further object of the invention is to provide a saddle support structure which is capable of providing various horizontal positions of the saddle for a given saddle height.

According to the invention, there is provided a bicycle saddle support structure comprising: a first seat post mountable to a seat pipe of a bicycle frame, the first seat post being provided at an upper portion thereof with a post support portion having a mounting bore which extends obliquely upwardly and forwardly of the bicycle; a second seat post for supporting the saddle, the second seat post being slidably fitted in the mounting bore; and a lock mechanism for locking the second seat post at an adjusted position relative to the mounting bore.

According to a preferred embodiment of the invention, the saddle support structure further comprises elastic means for upwardly urging the second seat post, the second seat post being preferably provided with an end stopper which engages the post support portion for limiting upward movement of the second seat post. This arrangement facilitates saddle position adjustment during running.

Advantageously, the lock mechanism is of a quick release type clamping assembly including an operating lever which provides an easy access for the cyclist assuming any riding posture.

Other objects, features and advantages of the invention will be fully understood from the following description of the preferred embodiment given with reference to the accompanying drawings.

BRIEF DESCRIPTION OF THE INVENTION

DETAILED DESCRIPTION

Figure 1:
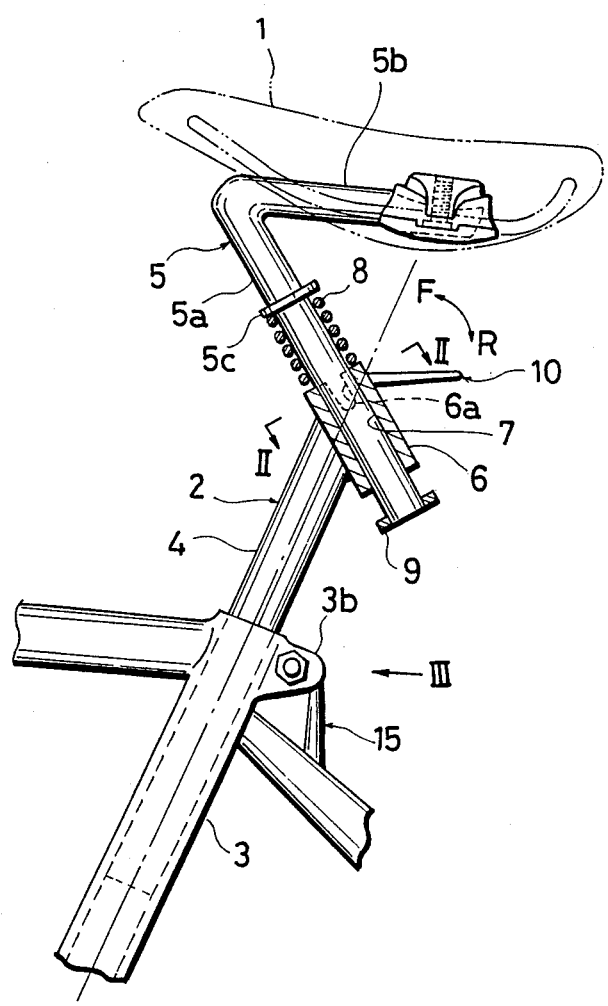
FIG. 1 is a fragmentary side of a bicycle equipped with a saddle support structure embodying the invention.

Referring first to FIG. 1 of the accompanying drawings, there is illustrated a bicycle saddle 1 mounted to a bicycle frame by means of a seat post assembly which is generally designated by reference numeral 2. According to the invention, the seat post assembly 2 includes a first seat post 4 which is adjustably fixed to a seat pipe 3 of the bicycle frame as inserted thereinto, and a second seat post 5 supported by the first seat post 4.

According to the illustrated embodiment, the first seat post 4 is provided at the upper end thereof with a post support pipe 6 defining a mounting bore 7. As shown in FIG. 1, the mounting bore 7 extends obliquely upwardly and forwardly of the bicycle.

On the other hand, the second seat post 5 includes a slide portion 5a slidably fitted in the mounting bore 7 of the post support pipe 6. The second seat post further has a saddle mounting portion 5b which, according to the illustrated embodiment, extends horizontally rearward from the upper end of the slide portion 5a. The saddle 1 is mounted to the saddle mounting portion 5b in a manner well known in the art.

The slide portion 5a of the second seat post 5 is formed at an intermediate portion thereof with an annular bearing flange 5c. A compression coil spring 8 surrounding the slide portion 5a is interposed between the flange 5c and the post support pipe 6 of the first seat post 4. Further, an end stopper 9 is removably fixed to the lower end of the slide portion 5a. The function of the spring 8 and the stopper 9 will be described hereinafter.

Figure 2:
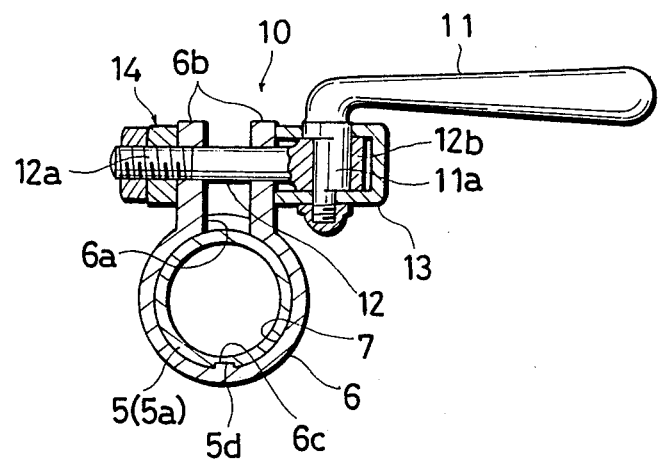
FIG. 2 is a sectional view taken on lines II—II in FIG. 1.

As better illustrated in FIG. 2, the post support pipe 6 of the first seat post 4 is formed at the upper end thereof with a longitudinal cutout 6a (see also FIG. 1) bounded by a pair of opposed longitudinal flanges 6b. The distance between the pair of flanges 6b is variable by means of a quick release type lock mechanism 10 to cause diametrical expansion and contraction of the post support pipe 6 at the longitudinal cutout 6a. Such diametrical variation of the post support pipe 6 is utilized to lock the second seat post 5 at an adjusted position and to unlock it for sliding adjustment.

The lock mechanism 10 comprises an operating lever 11, a clamp rod 12, a presser sleeve 13, and a double nut 14. The clamp rod 12 penetrates through the longitudinal flanges 6b of the post support pipe 6, and is formed at one end with a threaded portion 12a and at the other end with an enlarged head 12b. The double nut 14 is screwed on the threaded end portion 12a of the clamp rod 12 to come into abutment with one of the longitudinal flanges 6b. The presser sleeve 13 encloses the enlarged head 12b of the clamp rod 12 slidably relative thereto to come into abutment with the other longitudinal flange 6b. The operating lever 11 has an eccentric shaft 11a penetrating through the presser sleeve 13 and the enlarged head 12b transversely to the clamp rod 12.

Due to the eccentricity of the shaft 11a, the pivotal movement, in one direction (the arrow R direction in FIG. 1), of the operating lever 11 causes the presser sleeve 13 (together with a corresponding longitudinal flange 6b) to move toward the double nut 14 (the other longitudinal flange 6b), consequently reducing the diameter of the post support pipe 6 locally at the longitudinal cutout 6a. In this way, the second seat post 5 is firmly fixed or clamped to the first seat post 4.

On the other hand, the pivotal movement, in the opposite direction (in the arrow F direction in FIG. 1), of the operating lever 11 allows the longitudinal flanges 6b to move away from each other, with the result that the post support pipe 6 diametrically returns to the natural state under its own elasticity. In this way, the slide portion 5a of the second seat post 5 becomes slidable relative to the post support pipe 6.

When the second seat post 5 is put into its slidable state, the compression coil spring 8 acts to displace it upward. However, excessive upward displacement of the second seat post 5 is limited by the end stopper 9 which comes into abutment with the post support pipe 6 of the first seat post 4. The end stopper 9 is removable, so that the slide portion 5a of the second seat post 5 may be inserted into and taken out from the post support pipe 6 for assembly and disassembly, respectively.

Figure 3:
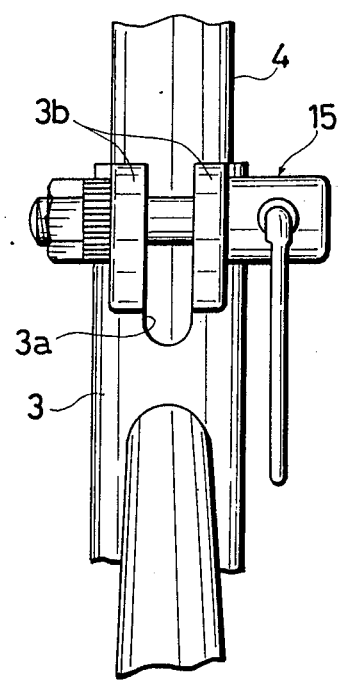
FIG. 3 is a rear view as seen in the direction of an arrow III in FIG. 1.

As shown in FIG. 3, the seat pipe 3 of the bicycle frame may be also formed at the upper end thereof with a longitudinal cutout 3a which is bounded by a pair of opposed longitudinal flanges 3b. The distance between the longitudinal flanges 3b is variable by a second quick release type lock mechanism 15 which is substantially identical in arrangement to the lock mechanism 10 described above. Thus, the first seat post 4 may be fixed at an adjusted position relative to the seat pipe 3 by suitably operating the second lock mechanism 15.

With the saddle support structure described above, the saddle position can be adjusted during riding in the following manner.

First, the cyclist (not shown) shifts substantially all of his (or her) body weight onto the pedals (not shown), and manually operates the lever 11 to pivot in the clamp releasing direction (the arrow F direction in FIG. 1). As a result, the second seat post 5 becomes slidable relative to the post support pipe 6 of the first seat post 4 as upwardly biased by the compression coil spring 8. Thus, raising of the cyclist's hips causes the saddle to move upwardly by the urging force of the spring 8, whereas the lowering of his (or her) hips forces the saddle to move downwardly against the spring force. In other words, the saddle position can be adjusted automatically by raising and lowering of the cyclist's hips without manually handling the saddle itself. After properly adjusting the vertical position of the saddle, the lever 11 is manually pivoted in the clamping direction (the arrow R direction in FIG. 1) to lock the second seat post 5 relative to the post support pipe 6a of the first seat post 6. It should be appreciated that the end stopper 9 prevents the second seat post 5 from unexpectedly coming out of the post support pipe 6a during such positional adjustment of the saddle.

During the above height adjustment, the saddle 1 can be also adjusted lengthwise of the bicycle. More specifically, due to the oblique orientation of the post support pipe 6, upward movement of the saddle results in simultaneous forward movement thereof, while downward movement is accompanied by simultaneous rearward movement.

As described hereinbefore, in certain bicycles such as mountain bicycles and BMX bicycles, a higher saddle position requires forward shifting of the cyclist's weight center to provide a greater pedalling force for running in upward slopes, whereas a lower saddle position requires rearward shifting of the weight center to ensure a higher safety for running in downward slopes. According to the invention, it is possible to readily change the saddle position during running to meet such requirements.

The operating lever 11 is positioned relatively close below the saddle 1, so that the cyclist can reach it during riding without much deforming the riding posture. Further, the quick release type lock mechanism 10 enables the rider to conduct positional adjustment of the saddle within a short time.

The saddle mounting portion 5b of the second seat post 5 extends horizontally rearward from the slide portion 5a which extends upwardly forward, so that the weight support center of the saddle 1 may be located on or adjacent to the longitudinal extension line of the first seat post 4 or of the seat pipe 3, as shown in FIG. 1. Thus, the saddle 1 can be always maintained at a suitable position relative to the pedals (not shown) despite a height adjustment thereof. It should be noted in this connection that the pedals are located at the lower end (not shown) of the seat pipe 3.

As shown in FIG. 2, the mounting bore 7 of the post support pipe 6 is preferably formed with a longitudinal projection 6c, whereas the outer cylindrical surface of the slide portion 5a of the second seat post 5 is formed with a longitudinal groove 5d for engagement with the longitudinal projection 6c. Due to such an arrangement, it is possible to prevent the saddle 1 from unexpectedly pivoting about the post support pipe 6 during positional adjustment.

The compression coil spring 8 may be dispensed with. In this case, the cyclist holds or sandwiches the saddle between his (or her) both legs, and raises or lowers it together with the hips for positional adjustment. Of course, the provision of the spring 8 is preferred to facilitate positional adjustment of the saddle 1 during running.

Obviously, in a well known manner, the saddle position may be adjusted by operating the second lock mechanism 15 for sliding movement of the first seat post 4 relative to the seat pipe 3. It should be appreciated that the horizontal movement of the saddle 1 obtained by the sliding movement of the first seat post 4 is quite opposite in direction to that obtained by the sliding movement of the second seat post 5. Therefore, it is possible to select various horizontal positions of the saddle for a given vertical position thereof by suitably combining the sliding movement of the two posts 4, 5.

The slanting angle of the mounting bore 7 of the post support pipe 6 relative to the vertical may be selected depending of various requirements. Naturally, a larger slanting angle increases the amount of horizontal shift of the saddle 1 per unit amount of vertical displacement.

The post support pipe 6 of the first seat post 4 may be replaced by any member having a mounting bore which extends upwardly forward.

The second seat post 5 is not limited to the illustrated configuration. For example, it may have a saddle mounting portion which extends upwardly rearward from the slide portion 5a.

The lever operated lock mechanism 10 may be substituted by any other lock mechanism which enables quick locking and unlocking of the second seat post 5 relative to the first seat post 4. For instance, the slide portion 5a of the second seat post 5 may be formed with notches which are suitably spaced longitudinally of the slide portion 5a, while the post support pipe 6 of the first seat post 4 is provided with an engaging member, which is easily operable by the cyclist, for engagement with and disengagement from a selected one of the notches.

The invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

We claim:

1. A support structure for a bicycle saddle comprising:
    a first seat post mountable to a seat pipe of a bicycle frame, said first seat post being provided at an upper portion thereof with a post support portion having a mounting bore which extends obliquely upwardly and forwardly of the bicycle,
    a second seat post for supporting said saddle, said second seat post having a slide portion which is slidably fitted in said mounting bore and extends at an angle to said first seat post; and
    a lock mechanism for locking said second seat post at an adjusted position relative to said mounting bore.

2. The saddle support structure as defined in claim 1, further comprising elastic means for upwardly urging said second seat post.

3. The saddle support structure as defined in claim 2, wherein said second seat post is provided with an intermediate bearing flange, and said elastic means comprises a compression coil spring interposed between said bearing flange and said post support portion of said first seat post.

4. The saddle support structure as defined in claim 2, wherein said second seat post is provided with an end stopper for limiting upward movement thereof.

5. The saddle support structure as defined in claim 1, wherein said second seat post includes a slide portion fitted in said mounting bore, and a saddle mounting portion extending at an angle to said slide portion.

6. The saddle support structure as defined in claim 5, wherein said saddle mounting portion is substantially horizontal and extends rearwardly from said slide portion.

7. The saddle support structure as defined in claim 1, further comprising means for preventing rotation of said second seat post relative to said post support portion.

8. The saddle support structure as defined in claim 7, wherein said rotation preventing means comprises a longitudinal projection formed on a wall surface defining said mounting bore, and a longitudinal groove formed on the outer surface of said second seat post for engagement with said longitudinal projection.

9. The saddle support structure as defined in claim 1, wherein said post support portion of said first seat post is in the form of a pipe having a longitudinal cutout, and said locking mechanism functions to cause diametrical expansion and contraction of said post support pipe at said cutout for locking and unlocking said second seat post.

10. The saddle support structure as defined in claim 9, wherein said longitudinal cutout of said post support pipe is provided with a pair of opposed longitudinal flanges, and said locking mechanism serves to releasably clamping said longitudinal flanges.

11. The saddle support structure as defined in claim 10, wherein said locking mechanism comprises:

a clamp rod penetrating said pair of longitudinal flanges, said clamp rod being formed at one end with a threaded portion and at the other end with an enlarged head;

a nut screwed on said threaded portion of said rod to engage one of said longitudinal flange;

a presser sleeve enclosing said enlarged head of said rod to engage the other longitudinal flange; and a operating lever having an eccentric shaft penetrating through said sleeve and said enlarged head transversely of said clamp rod, said lever being pivotable to bring said sleeve toward and away from said nut.

12. The saddle support structure as defined in claim 11, wherein said nut is in the form of a double nut.

* * * * *